US010341147B1

(12) United States Patent
Khare et al.

(10) Patent No.: US 10,341,147 B1
(45) Date of Patent: Jul. 2, 2019

(54) HIGH PERFORMANCE EQUALIZER ACHIEVING LOW DETERMINISTIC JITTER ACROSS PVT FOR VARIOUS CHANNEL LENGTHS AND DATA RATES

(71) Applicant: MegaChips Corporation, Osaka (JP)

(72) Inventors: Abhishek Kumar Khare, Bangalore (IN); Raghavendra R. G, Bangalore (IN); Anil Chawda, Bangalore (IN); Shubham Srivastava, Bangalore (IN)

(73) Assignee: MegaChips Corporation, Osaka (JP)

( * ) Notice: Subject to any disclaimer, the term of this patent is extended or adjusted under 35 U.S.C. 154(b) by 0 days.

(21) Appl. No.: 15/890,285

(22) Filed: Feb. 6, 2018

(51) Int. Cl.
*H04B 1/16* (2006.01)
*H04L 25/03* (2006.01)
*H04L 12/26* (2006.01)

(52) U.S. Cl.
CPC ......... *H04L 25/03828* (2013.01); *H04B 1/16* (2013.01); *H04L 43/087* (2013.01)

(58) Field of Classification Search
CPC ........... H04L 25/03878; H04L 25/0296; H04L 25/03019; H04L 27/01; H04L 25/00; H04L 25/03828; H04L 43/087; H03K 5/1565; H03K 5/26; H03F 2200/144; H03F 2200/165; H03F 2200/375; H03F 2200/78; H03F 2203/45212; H03F 3/45475; H03F 3/45744; H04B 1/16
See application file for complete search history.

(56) References Cited

U.S. PATENT DOCUMENTS

| | | | |
|---|---|---|---|
| 9,020,024 B1* | 4/2015 | Chaahoub | H04L 25/03885 375/229 |
| 9,049,068 B1 | 6/2015 | Cyrusian | |
| 9,059,874 B2 | 6/2015 | Cyrusian | |
| 9,319,039 B2 | 4/2016 | Roytman et al. | |
| 9,397,823 B2 | 7/2016 | Zerbe et al. | |
| 9,544,170 B2 | 1/2017 | Farjad-Rad | |
| 2007/0047636 A1 | 3/2007 | Lim et al. | |
| 2012/0201289 A1* | 8/2012 | Abdalla | H04L 25/0272 375/233 |
| 2013/0285726 A1* | 10/2013 | Roytman | H03K 5/26 327/175 |
| 2018/0076985 A1* | 3/2018 | Schell | H04L 25/03057 |
| 2018/0097139 A1* | 4/2018 | Li | H04B 10/00 |

* cited by examiner

*Primary Examiner* — Khanh C Tran
(74) *Attorney, Agent, or Firm* — Osha Liang LLP

(57) ABSTRACT

A high performance equalization method is disclosed for achieving low deterministic jitter across Process, Voltage and Temperature (PVT) for various channel lengths and data rates. The method includes receiving input signal at front end of a receiver upon passing through a channel, generating with an eye-opening monitor circuit a control code based on channel conditions, and equalizing with a continuous-time linear equalization equalizer (CTLE) circuit the input signal based on the control code such that the eye-opening monitor circuit and the CTLE circuit are biased based on their corresponding replica circuits, and the control code is generated in a feedforward configuration.

17 Claims, 11 Drawing Sheets

Equalization Scheme block diagram

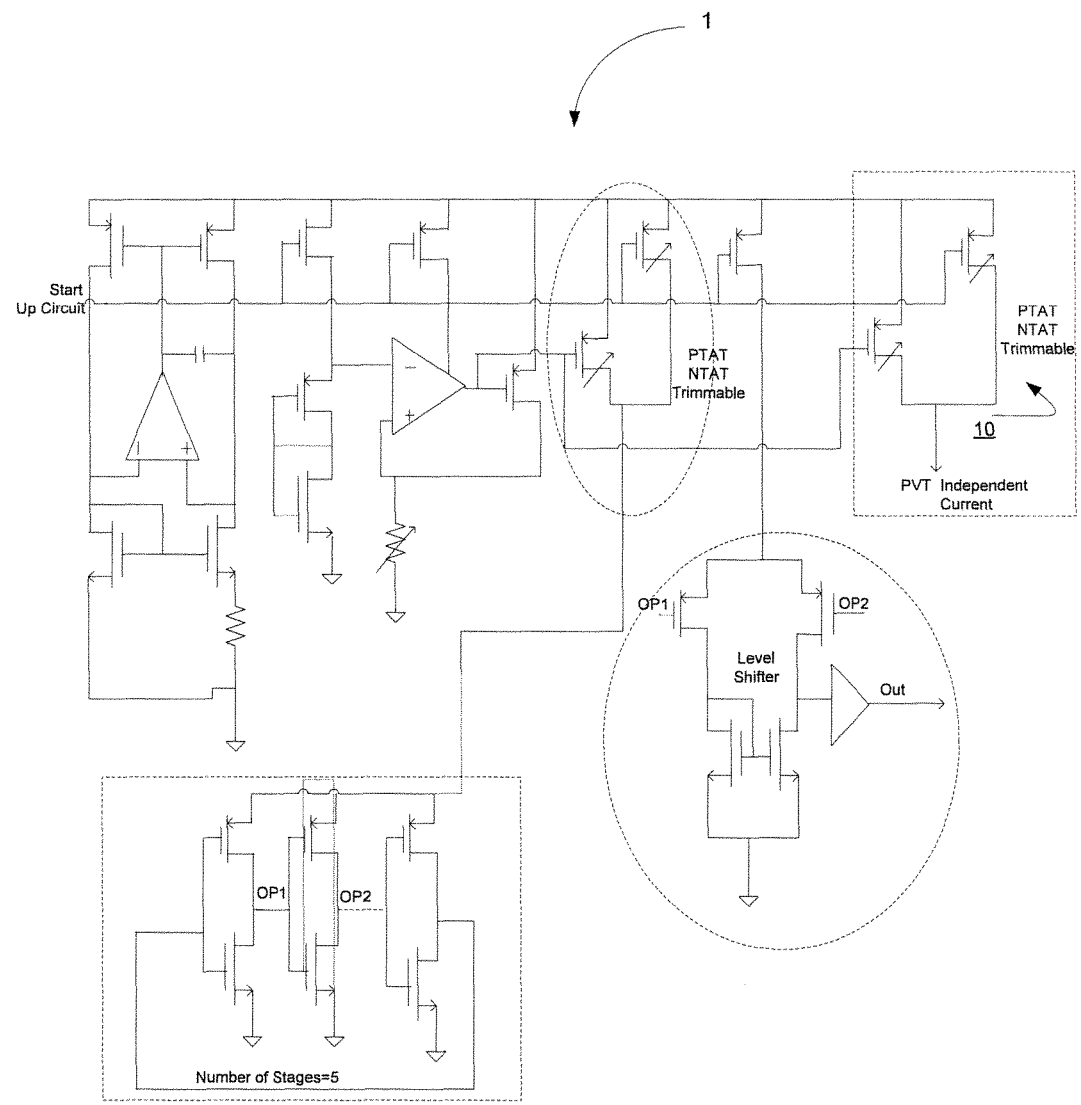
Fig. 1: HSOSC – Highly stable ring oscillattor (Known Art)

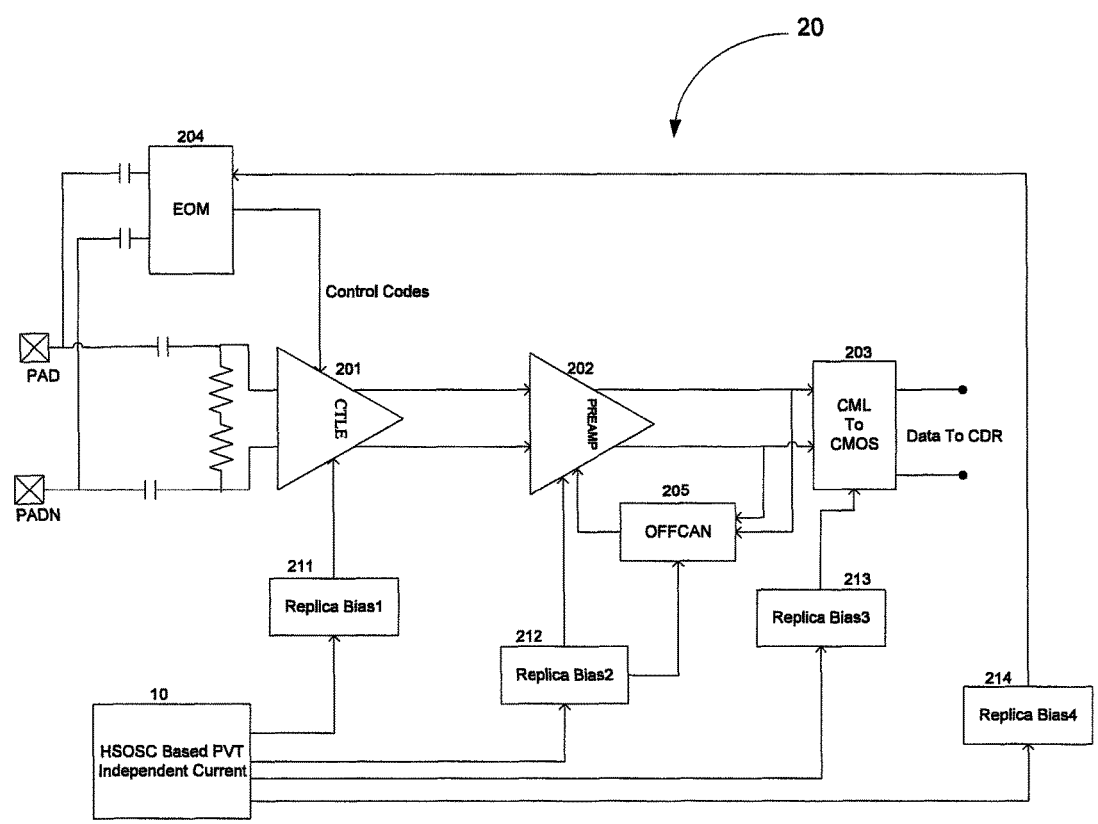
Fig. 2: Equalization Scheme block diagram

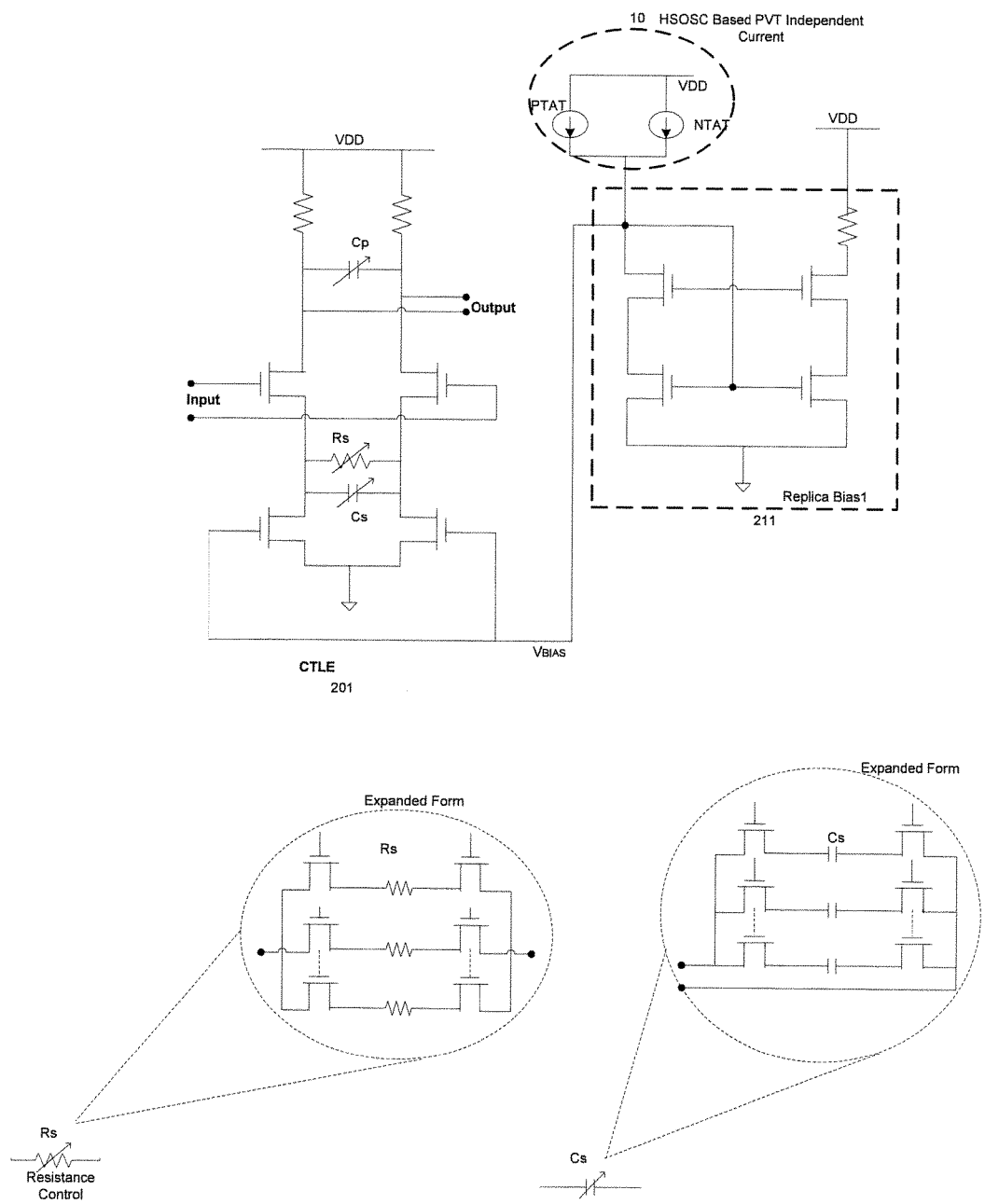
Fig. 3: CTLE

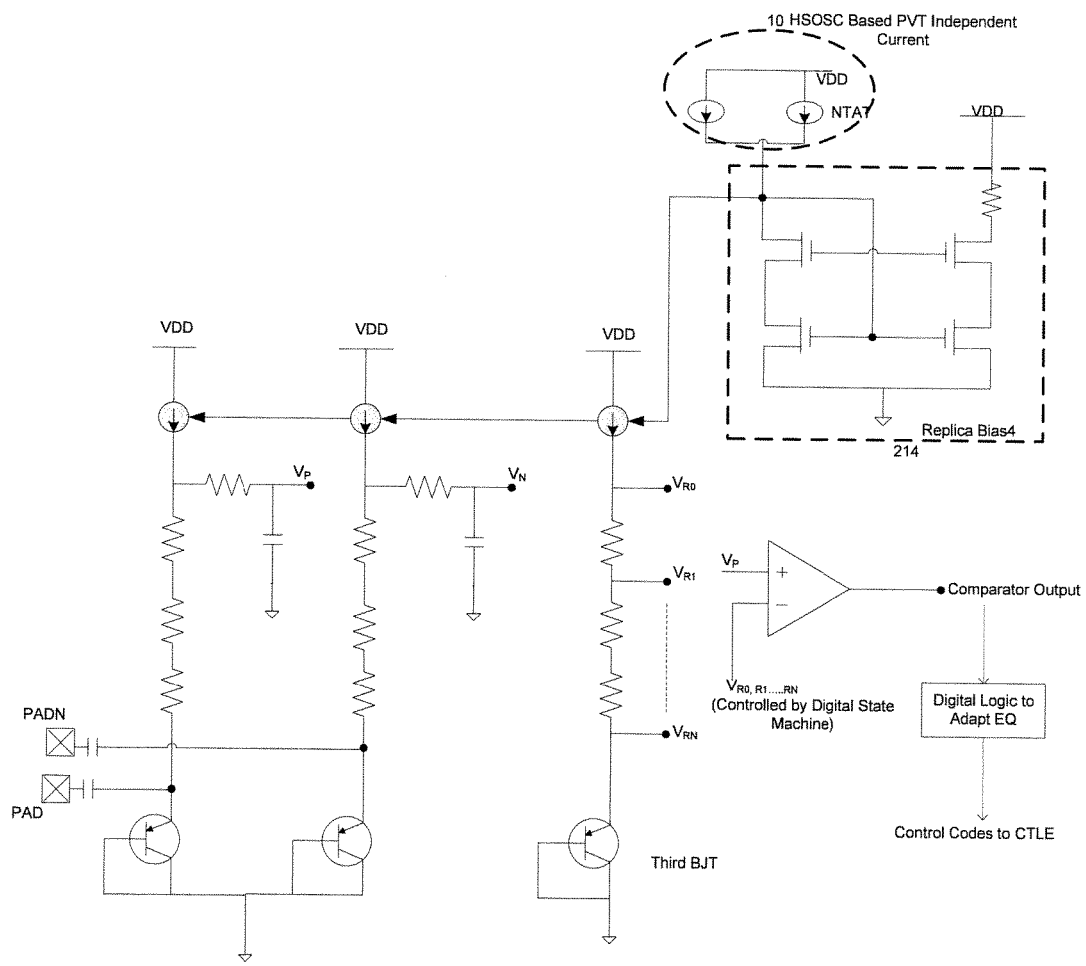
Fig. 4: EOM Circuitry (1D-VERTICAL DIMENSION)

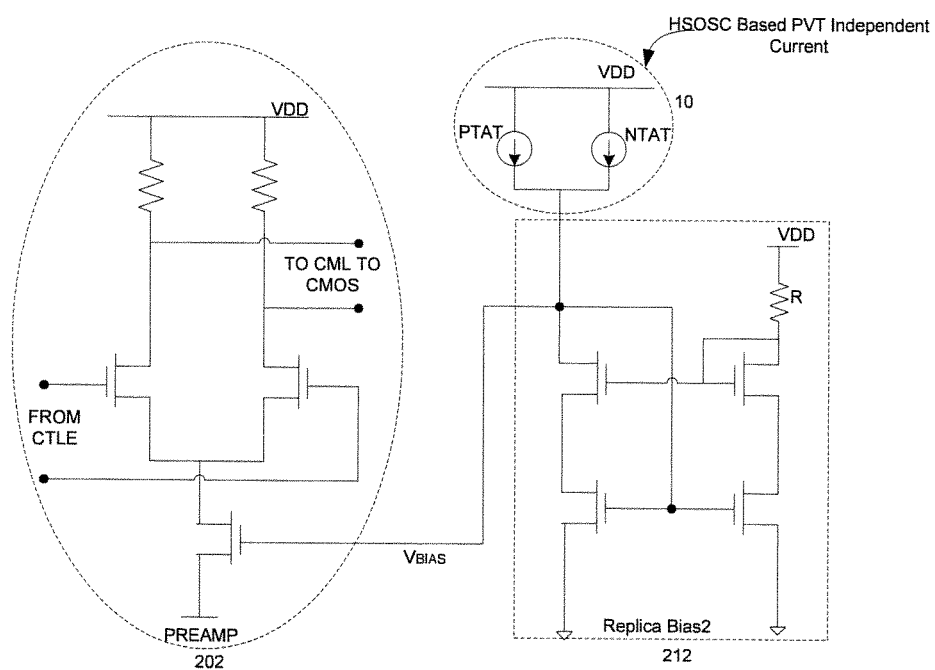
Fig. 5: Pre-amplifier circuit (without OFFCAN)

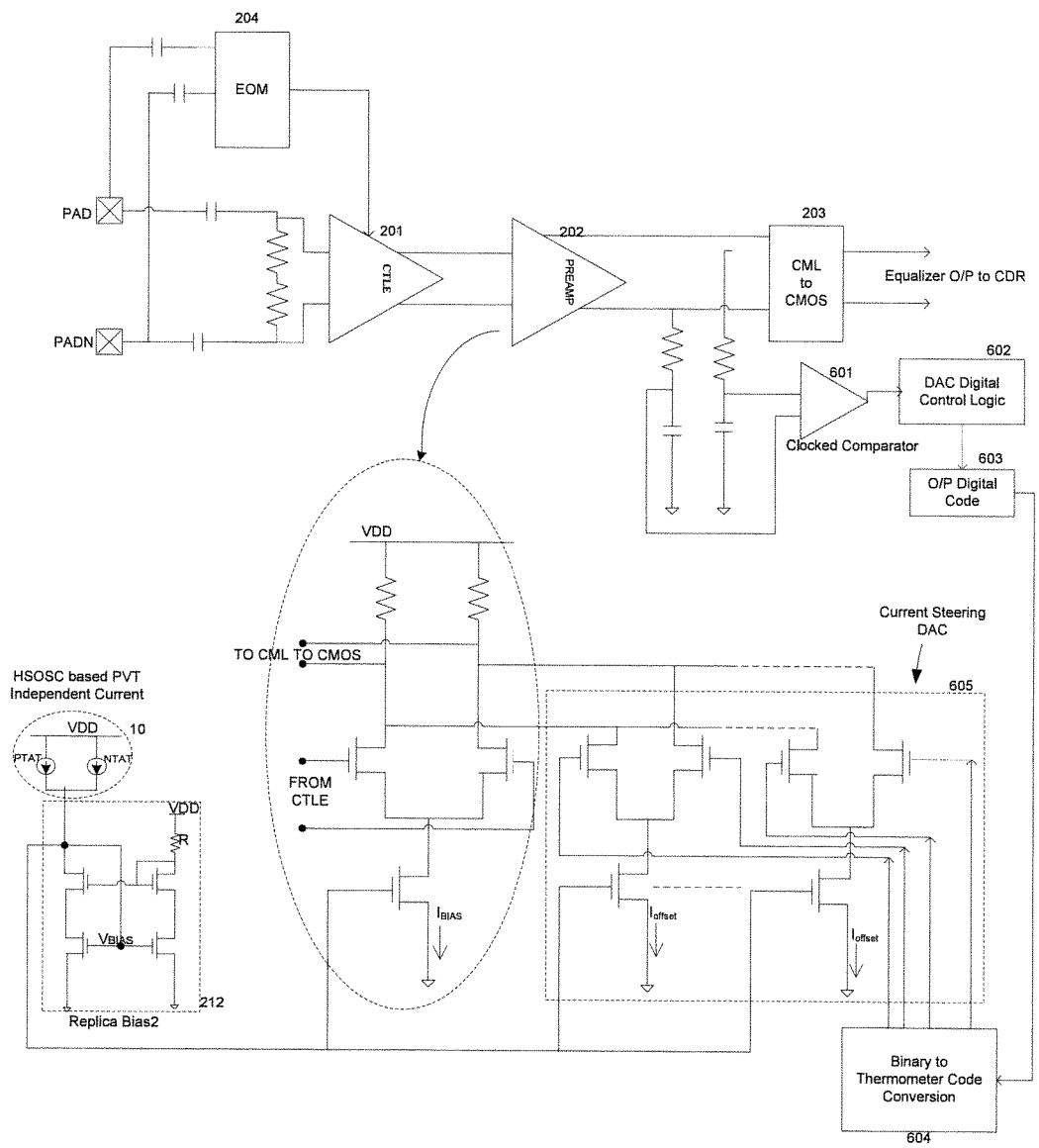
Fig. 6: Feedback Digital OFFCAN Loop

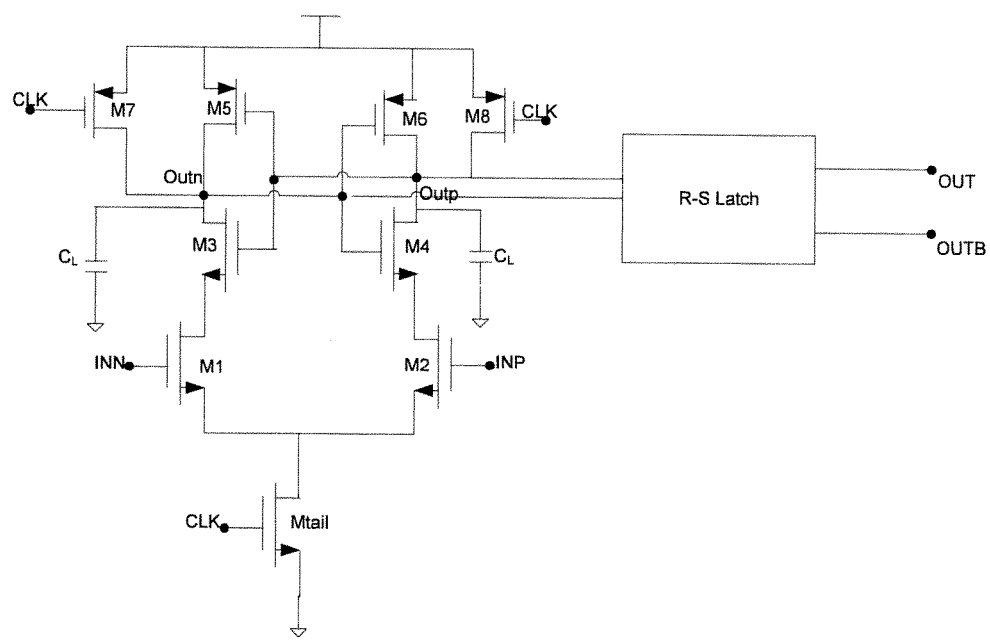
Fig. 6a: Clocked Comparator

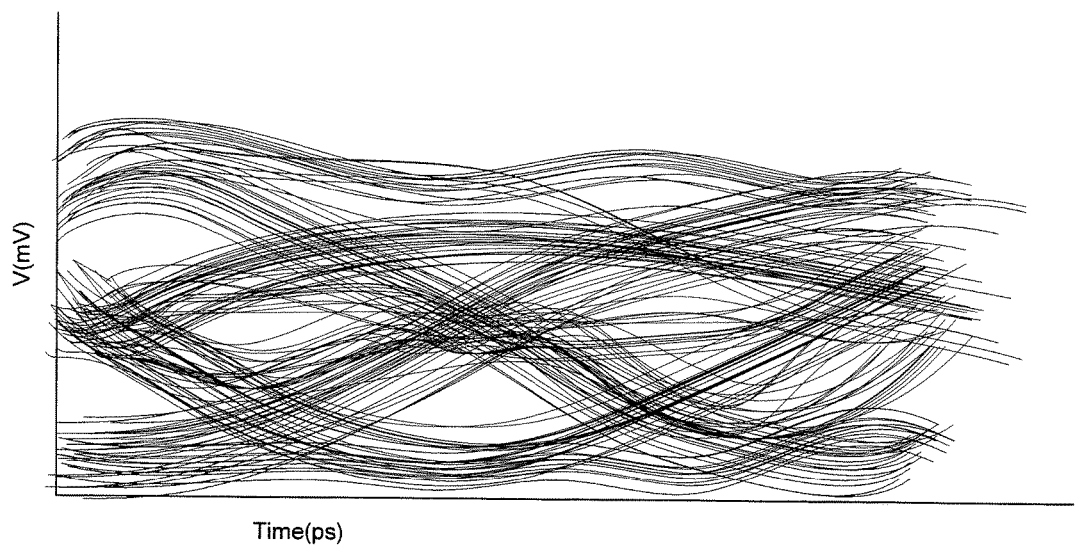
Fig. 7a : EYE at CTLE Input

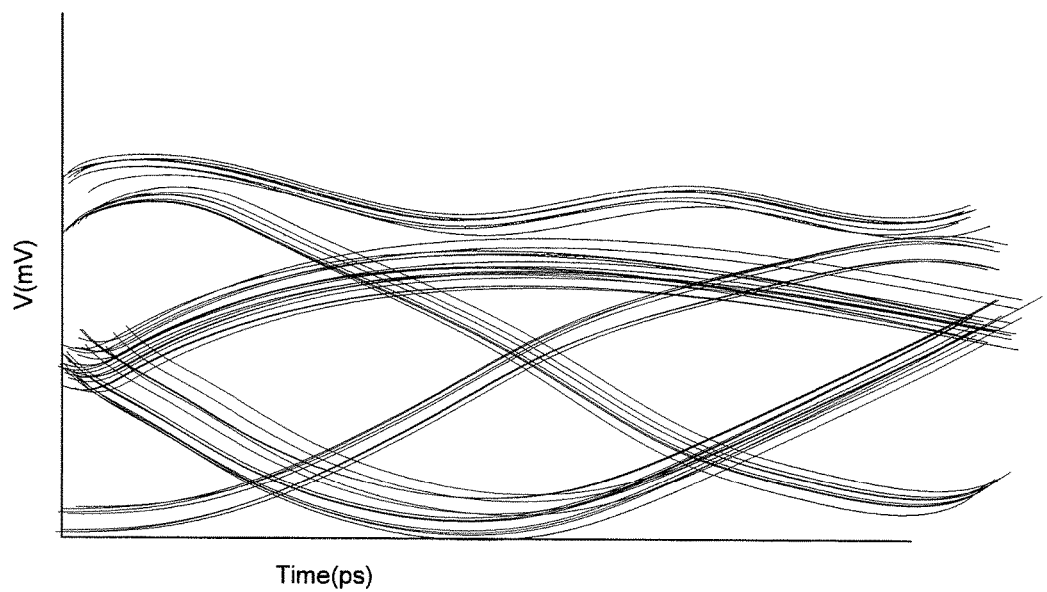
Fig. 7b :EYE at CTLE Output

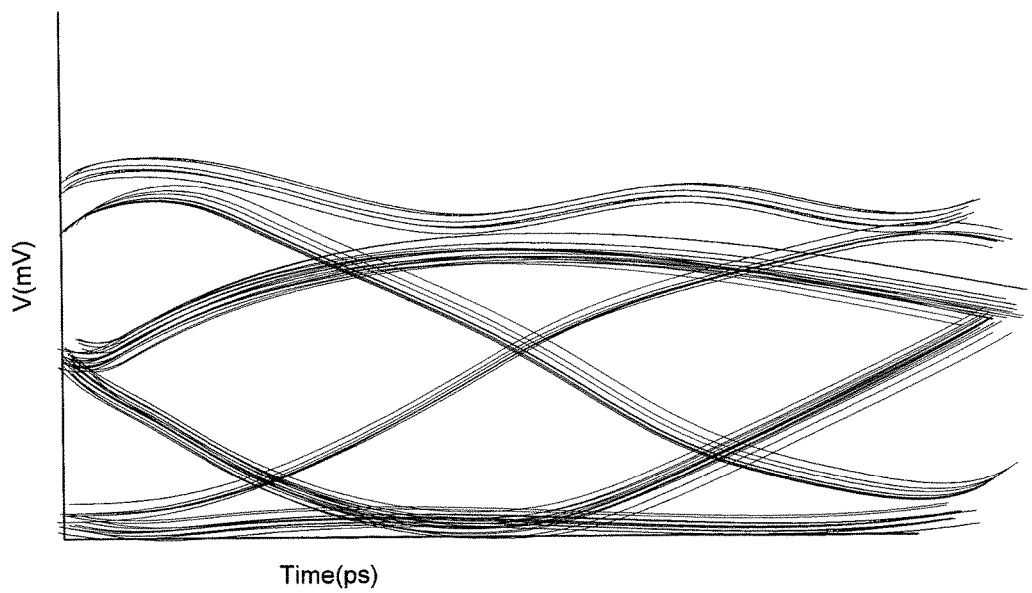
Fig. 7c :EYE at PREAMP Output

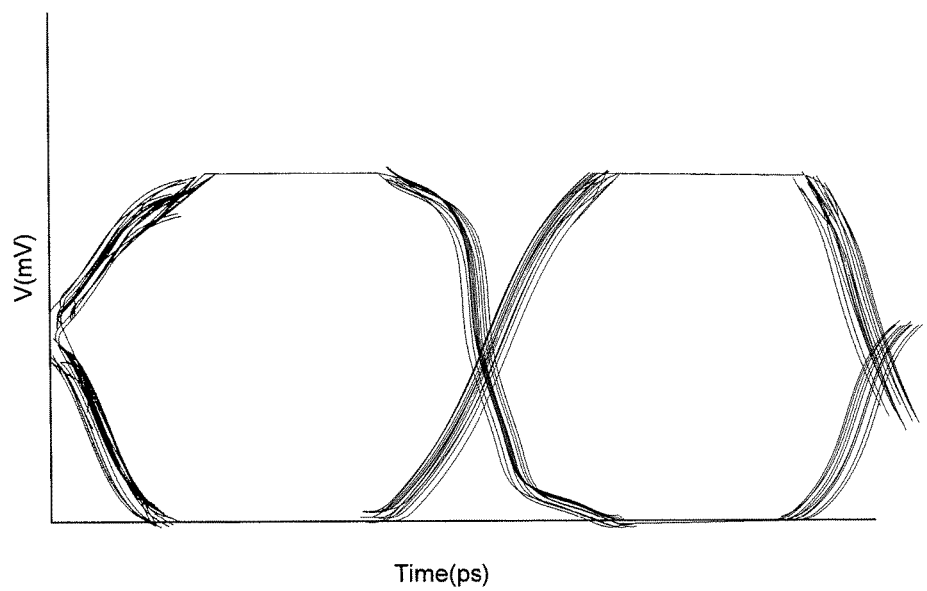
Fig. 7d :EYE at ICML Output

HIGH PERFORMANCE EQUALIZER ACHIEVING LOW DETERMINISTIC JITTER ACROSS PVT FOR VARIOUS CHANNEL LENGTHS AND DATA RATES

FIELD OF THE INVENTION

The present disclosure relates to a high performance equalizer achieving low Deterministic Jitter (DJ) and more particularly to Continuous Time Linear Equalization (CTLE) based equalizer chain to achieve low Deterministic Jitter across PVT (Process, Voltage and Temperature) for various channel lengths and data rates.

BACKGROUND OF THE INVENTION

Equalization of signal at the front end of a receiver to compensate for channel losses is a well known phenomenon in communication systems. Equalizer which adapt and operate at various channel lengths, data rates, transmitter swing, pre-emphasis settings etc are desirable. Particularly, for high performance, an equalizer must be able to adapt to various conditions (channel length, data rates etc) at high speed as well as produce low output jitter.

Several equalization schemes have been suggested in the past, however, they fail to achieve high speed of operation. Also, such schemes of the past require high area and power consumption as well as cause high deterministic jitters. Particularly, a conventional equalizer is not able to provide optimal control code during a training period itself (i.e. with no extra timings overhead), for data rates 1.60 Gbps to 5.4 Gbps, cable lengths 10 cm to 15 feet, various transmitter swing, various pre-emphasis/de-emphasis settings and achieve less than 0.15 UI deterministic jitter (DJ) across PVT variations.

U.S. Pat. Nos. 9,049,068 and 9,059,874 recite equalization schemes but lack eye opening monitoring. Particularly, US '068 recite low pass and high pass filter in parallel to an equalizer to generate rail to rail signal. US '874 recite a switched continuous time linear equalizer with an integrated sampler having feedback equalizer. However, their mechanism involves complex topology with no eye opening monitoring circuit. Further, equalizer of these arts consumes a lot of power and area, which is not desirable in several digital electronic circuitries.

U.S. Pat. Nos. 9,319,039 and 9,397,823 relate to reduction of jitter. However, these arts do not have any eye opening monitoring and biasing mechanism to achieve high speed equalization.

US2007/0047636 and U.S. Pat. No. 9,544,170 describe high speed and adaptive equalizer respectively. Particularly, US '636 recite about high speed line equalizer and method thereof. US '170 disclose adaptive equalization working on feedback loop taking longer convergence time with more chances of error. However, US '636 is not relevant for embedded clock applications. US '170 relies on feedback mechanism and this is not able to achieve high speed adaption. Further, both these arts have no offset cancellation mechanism to achieve low deterministic jitter, as desired.

In view of the foregoing, there is a requirement of high performance equalizer functioning at high speed for adapting to various data rates, channel lengths, transmitter swings, pre-emphasis/de-emphasis settings etc. Also, it is desirable that deterministic jitters (DJ) is low from the gain stages (after the equalization) by reducing the effect of random offset accumulation.

SUMMARY

The present disclosure provides an equalization scheme and an equalization system for a receiver achiving low deterministic jitter across PVT for various channel lengths and data rates. Existing equalization schemes fail to achieve high speed of operation well as cause high deterministic jitters.

One or more embodiments of the present disclosure provides an equalization scheme for a receiver including receiving input signal at front end of the receiver upon passing through a channel, generating with an eye-opening monitor circuit a control code based on the channel conditions, equalizing with a continuous-time linear equalization equalizer (CTLE) circuit the input signal based on the control code, wherein the eye-opening monitor circuit and the CTLE circuit are biased based on their corresponding replica circuits and the control code is generated in a feedforward configuration.

One or more embodiments of the present disclosure provides an equalization system for a receiver including an input signal received at front end of the receiver upon passing through a channel, an eye-opening monitor circuit configured to generate a control code based on the channel conditions, and a CTLE circuit configured to equalize the input signal based on the control code, wherein the eye-opening monitor circuit and the CTLE circuit are biased based on their corresponding replica circuits; and the eye-opening monitor circuit provides the control code to the equalizer circuit in a feedforward configuration.

One or more embodiments of the present disclosure provides equalization system for a receiver including an input signal received at front end of the receiver upon passing through a channel, an eye-opening monitor circuit configured to generate a control code based on the channel length and pre-emphasis settings of a transmitter, an equalizer circuit configured to equalize the input signal based on the control code, a differential amplifier configured to amplify the output of the equalizer circuit, an offset cancellation circuit configured to reduce random offset of the differential amplifier by feedback of an offset correction code, a CML to CMOS circuit configured to convert data swing of the output of the differential amplifier to rail to rail swing, wherein the eye-opening monitor circuit, the equalizer circuit, the differential amplifier, offset cancellation circuit and CML to CMOS circuit are biased based on their corresponding replica circuits which are biased by a stable oscillator and wherein the eye-opening monitor circuit and offset cancellation circuit generates the control code and the offset correction code respectively during link training mode of the equalizer circuit.

One or more embodiments of the present disclosure provides equalization system for a receiver including an input signal received at front end of the receiver upon passing through a channel, an equalizer circuit configured to equalize the input signal, a differential amplifier configured to amplify the output of the equalizer circuit, and an offset cancellation circuit configured to reduce random offset of output of the differential amplifier by feedback of an offset correction code wherein the offset cancellation circuit generates the offset correction code during link training mode of the equalizer circuit.

These as well as other aspects and advantages of the present disclosure will become more apparent to those of ordinary skill in the art by reading the following detailed description, with reference to the accompanying drawings.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure together with the description.

FIG. 1 shows a highly stable ring oscillator circuit known in the art.

FIG. 2 illustrates functional block diagram of equalization scheme in accordance with an embodiment of the present disclosure.

FIG. 3 illustrates a CTLE circuit.

FIG. 4 illustrates an eye opening monitoring (EOM) circuit.

FIG. 5 is a pre-amplifier circuit without an offset cancelation.

FIG. 6 is a feedback digital offset correction loop in accordance with an embodiment of the present disclosure.

FIG. 6a illustrates clocked comparator circuit.

FIGS. 7a to 7d are eye diagram showing DJ improvement at the output of various blocks in equalizer chain.

DETAILED DESCRIPTION OF THE INVENTION

The present disclosure relates to a high performance equalizer achieving low deterministic jitter across PVT variation for various channel lengths and data rates. In the embodiments defined hereinafter, the equalizer and gain stages are biased by utilizing a highly stable ring oscillator (HSOSC) designed on CMOS bulk technology which has very less frequency variation across PVT. However, the invention is not limited to the oscillator or the bulk CMOS technology and the equalization scheme could be implemented using any other oscillator stable across PVT or could be equally applied to any other integrated circuit technologies respectively.

For high performance of an equalizer, it is desired that the optimal equalizer control codes are selected with minimum delay, so as to perform the equalization efficiently across various channel lengths, data rates, transmitter swing and pre-emphasis/de-emphasis settings. Further, it is desired that there is minimum random offset leading to minimal detenitinistic jitter.

FIG. 1 is a known Highly Stable Ring Oscillator (HSOSC) 1 described in the US Patent Application Number 2015/403393 filed on Jan. 11, 2017 [claiming priority of Indian Patent Application Number 201611011147 filed on Mar. 30, 2016], of the same assignee as of the present application. The HSOSC 1 shown in FIG. 1 has an operating frequency of 135 MHz and is designed in 40 nm CMOS bulk technology. The HSOSC 1 achieves less than (±2%) frequency variation across PVT as described in the said patent application document. Stable oscillator HSOSC 1 provides PTAT and NTAT current which are added in proper ratio's to generate a PVT independent current. The PTAT and NTAT currents which were used to make the oscillator frequency stable are copied by mirroring as shown in FIG. 1 to generate a HSOSC Based PVT Independent Current 10 and then used as bias current source in critical analog blocks of the equalizer.

FIG. 2 is a functional block diagram of the high performance equalization scheme 20 in accordance with an embodiment of the present disclosure. The equalization scheme 20 consists of HSOSC Based PVT Independent Current 10, CTLE (continuous time linear equalizer) circuit 201, PREAMP 202, CML to CMOS 203, EOM 204, OFF-CAN 205, replica bias1 211, replica bias2 212, replica bias3 213 and replica bias4 214.

As per an embodiment of the present disclosure, the equalization scheme 20 is implemented on 40 nm bulk CMOS technology, with voltage range 0.98V to 1.21V and junction temperature −40° C. to 125° C. for meeting the eDP1.4b standard requirements. However, the invention is not limited to the said standard or the ranges and may well be implemented for other characteristics and configurations.

As per FIG. 3, the CTLE circuit 201 has been designed based on the usual source degeneration topology using resistor bank (Rs) and capacitor bank (Cs) which is well known in the art. The CTLE circuit 201 is a linear filter which attenuates low frequency and provides gain for high frequency. The resistor bank (Rs) and capacitor bank (Cs) may be changed using the control bits/code as shown in the FIG. 3. The CTLE circuit 201 also has a capacitor (Cp) which takes care of any pre-emphasis done at the transmitter side, particularly for short cable lengths. The code for controlling the Rs, Cs and Cp is given by the EOM 204 as explained later. Further, as shown in FIG. 3, the bias voltage for the CTLE circuit 201 is provided by the replica bias1 211, which in turn is supplied a bias current independent of PVT variation by the HSOSC 1. Replica bias circuits (replica bias1 211 and others) have been designed such that they take HSOSC Based PVT Independent Current 10 as input and generate optimal bias voltages for CTLE circuit 201 and gain stages of the equalizer chain. Particularly, the replica bias circuits are the replicas of their corresponding circuits which they are biasing and provide suitable bias voltage by tracking any PVT variations. For instance, replica bias1 211 provides bias voltage ($V_{bias}$) for the CTLE circuit 201, while tracking and compensating for the PVT variation in the CTLE circuit 201. Also, the Rs, Cs and Cp shown in FIG. 3 are trivial and their value changes based on the code input to them.

As per an embodiment of present disclosure, the CTLE circuit 201 characteristics are based on a reference equalizer as published in eDP1.4b by VESA, but the present disclosure is not limited to the said standard and may well be implemented for other characteristics and configurations. As shown in FIG. 2, the equalization scheme 20 has the EOM 204 which is connected in parallel with the CTLE circuit 201 and is biased by the replica bias4 214. This configuration of EOM 204, being connected in parallel to the CTLE circuit 201, allows it to provide optimal equalizer settings of the CTLE circuit 201 in a feed-forward manner which allows faster configuration. Particularly, when the power is switched on, the equalizer undergoes link training (LT), known as LT1. The LT1 training is identified by the pattern "1010" provided as an input to the receiver by the transmitter. During this LT1 training period, the EOM 204 calculates the optimum equalizer codes for Rs, Cs and Cp of the CTLE circuit 201 as explained hereinafter.

The EOM 204 in accordance with an embodiment of the present disclosure is shown in FIG. 4. The EOM 204 is based on a 1-dimesion (1-D) vertical eye opening. A 1-D vertical eye opening monitor is simple to implement and consumers less power and area as compared to a 2-D eye opening. Particularly, unlike a 2-D eye opening, 1-D eye opening does not require multiple clock phases or phase interpolator. While the accuracy of a 1-D opening will be less than that of a phase interpolator based 2-D eye opening, however, an embodiment of the present disclosure considers 1-D opening for the advantages mentioned above and its simpler configuration. As shown in FIG. 4, the inputs of EOM 204 are connected to PAD and PADN (the front end of the receiver) which connect with BJT (Bipolar Junction Transistor) based clipper average circuitry biased with HSOSC Based PVT Independent Current 10 to generate average voltages $V_P$ and $V_N$ respectively. Particularly, the clipper average circuitry clips lower part of incoming waveform and this clipped waveform is RC filtered to generate the average voltages $V_P$ and $V_N$. More particularly, $V_P$ is a function of incoming swing at the front end of the receiver (PAD), which in turn represents the transmitter swing and channel attenuation. A low $V_P$ means a high incoming swing and vice-versa.

As shown in FIG. 4, a third BJT transistor generates a reference voltage $V_R$ which is compared against $V_P$ to generate the EOM 204 output. As per the circuits shown in FIG. 4, the voltage $V_P$ stabilizes and settles to an average value within 10 μs of switching on. After this 10 μs, the EOM 204 digital logic starts to operate and a 4-bit down counter starts counting which provides 16 different reference voltages $V_R$ to the comparator. A comparator, having initial output as high, compares the voltage $V_P$ with the reference voltages $V_R$ which is changed using the counter. Once the $V_R$ value crosses $V_P$, the comparator output becomes low and the counter stops. This counter value is latched and encoded as a 4-bit output of the EOM 204. The 4-bit EOM 204 output generates the code for controlling the Rs, Cs and Cp of the CTLE circuit 201 based on the logic as given in Table 1 below.

TABLE 1

Code for controlling the Rs, Cs and Cp based on EOM 204 output

| EOM_OUTPUT | EQ1 (Rs) | EQ2 (Cs) | EQPREEMP (Cp) | Remarks |
|---|---|---|---|---|
| d0 | 000 | 000 | 011 | Caters to short cable with Pre-Emphasis |
| d1 | 000 | 000 | 011 | |
| d2 | 000 | 000 | 001 | |
| d3 | 000 | 000 | 001 | |
| d4 | 000 | 000 | 000 | Caters to short cable without Pre-Emphasis |
| d5 | 000 | 000 | 000 | |
| d6 | 001 | 000 | 000 | |
| d7 | 001 | 000 | 000 | |
| d8 | 010 | 001 | 000 | Caters to long cable with Pre-Emphasis |
| d9 | 010 | 001 | 000 | |
| d10 | 011 | 001 | 000 | |
| d11 | 011 | 001 | 000 | |
| d12 | 100 | 010 | 000 | Caters to long cable without Pre-Emphasis |
| d13 | 100 | 010 | 000 | |
| d14 | 101 | 011 | 000 | |
| d15 | 101 | 011 | 000 | |

As per Table 1, the EOM 204 output provides four categories of results d0-d3, d4-d7, d8-d11 and d12-d15 representing short cable with pre-emphasis, short cable without pre-empahsis, long cable with pre-emphasis and long cable without pre-emphasis respectively. Accordingly, based on the EOM 204 output value, the control codes for CLTE circuit 201 are generated with almost no delay (or with minimum delay) for various cable lengths (short and long), transmitter settings (with/without pre-emphasis) as per Table 1.

As per the equalization scheme 20, the EOM 204 has been designed using a dedicated replica circuit based on PVT independent current and works in a feedforward configuration. Accordingly, the EOM 204 circuit is able to provide initial optimal control code for the CTLE circuit 201 during LT1 (1010) training period itself, by working in parallel after start-up, leading to no extra timing over ahead. For instance, as prior arts adaptation schemes do not work during LT1 phase and rather work only during additional equalizer calibration phase (as provided in eDP1.4b), they require a time period of 10 μs to 1000 μs (typically 200-400 μs) during this additional phase. On the other hand, the embodiment of present disclosure requires no need of additional equalizer training phase as it accomplishes the task of identifying the optimal code during the LT1 phase itself. Also, the inventors have observed that feedforward EOM 204, as per an embodiment of the present disclosure, maintains jitter <40 pS (i.e. <0.22 UI) at 5.4 Gbps across various channel conditions and transmitter swing which in the absence of feedforward EOM 204 causes more than 40 pS (i.e. >0.22 UI) jitter. Also, as per an embodiment of the present disclosure, after initial LT1 training, the EOM 204 circuit can be turned OFF leading to no additional power consumption. Also, the EOM 204 is in the 1-D configuration which provides loop stability with no phase margin issues.

Table 2 is showing deterministic jitter (DJ) at various stages in equalizer chain for different cable lengths, transmitter swing, jitter at transmitter side, preferred EQ (control) code. Particularly, the Table 2 represents the jitter performance of the equalizer chain as per an embodiment of the present disclosure for various Tx swings and channel lengths based on the optimal EQ code provided by the feed forward EOM scheme on actual test data. PRBS7 data pattern has been utilized for this jitter evaluation of Table 2. The column 'Recommended EQ1/EQ2/PREEMP code' represents the actual codes provided by the feed forward EOM scheme and applied to the CTLE circuit. The table summarizes the efficacy of the EOM scheme in providing optimal jitter for various channels and Tx swing conditions.

TABLE 2

Jitter across various TX Swing and Channel Conditions

| Tx Swing (mV) | Tx Jitter (pS) | Channel Length (Inch) | Pattern | Recommended EQ1/EQ2/ PREEMP code | PAD jitter (pS) | CTLE_IN Jitter (pS) | CTLE_OUT Jitter (pS) | PREAMP_OUT Jitter (pS) | ICML_OUT Jitter (pS) |
|---|---|---|---|---|---|---|---|---|---|
| 400.00 | 22.39 | 6 | PRBS | 000/000/000 | 26.84 | 26.43 | 28.24 | 26.39 | 25.75 |
| 800.00 | 22.11 | 6 | PRBS | 000/000/000 | 26.81 | 26.44 | 28.59 | 27.27 | 26.94 |
| 400.00 | 11.25 | 30 | PRBS | 100/010/000 | Eye Closed | Eye Closed | 23.77 | 21.33 | 22.10 |
| 800.00 | 11.29 | 30 | PRBS | 010/001/000 | Eye Closed | Eye Closed | 32.54 | 33.00 | 32.34 |
| 400.00 | 12.90 | 16 | PRBS | 010/001/000 | 50.08 | 48.97 | 27.84 | 26.39 | 24.65 |

FIG. 5 show the PREAMP 202 which consists of a differential amplifier biased using replica bias2 212 circuit. The PREAMP 202 amplifies the output obtained from CTLE circuit 201 to provide the necessary gain to the signal equalized by the CTLE circuit 201. The operation of the PREAMP 202 circuit described here is trivial and the invention is not limited by the circuit or use thereof.

FIG. 6 show the OFFCAN 205 which is a low pass filter network that extracts the DC voltage at the output of PREAMP 202 and compensates the offset in the output of the PREAMP 202 using a digital feedback loop. As shown in FIG. 6, this DC voltage at the positive and negative output terminals of the PREAMP 202 is compared using a clocked comparator 601 and the output of the comparator 601 controls a current steering DAC 605 by incrementing or decrementing its input codes. A divided version of HSOSC 1 clock acts as an input clock to the clock comparator 601.

FIG. 6A shows the clocked comparator 601 circuit, which has inputs (INN and INP), outputs (OUT, OU IB), transistors (M1-M8 and Mtail) and R-S latch. During the reset phase, i.e. when CLK=0, Mtail transistor is off, therefore both the output nodes are set to VDD to define a start condition. During the comparison phase, i.e when CLK=1, Mtail transistor is on the output nodes which had been pre-charged to VDD, start to discharge. The R-S latch is used to calculate the difference and thereafter amplifies the same.

As shown in FIG. 6, the DAC 605 is connected to the output of the PREAMP 202 and based on the code provided by the clocked comparator 601 to the DAC 605, the current of the DAC 605 is changed. As per an embodiment of the present disclosure, the DAC 605 covers a voltage range of 0 to 45 mV for a 4 bit code, thus providing a resolution of 3 mV.

As mentioned above, the DC voltage at the positive and negative output terminals of the PREAMP 202 is compared and once change in polarity at the output of the clocked comparator 601 is detected, the code which caused the flip in comparator output is stored as an offset correction code. As per an embodiment of the present disclosure, initially the comparator output is high and loop starts with a mid-code, then, till comparator output becomes low, the clocked comparator 601 keeps on incrementing the code. Once a change in polarity at the output of the clocked comparator 601 is detected the code (offset correction code) is frozen. This binary code (offset correction code) is converted into thermometric code and is applied to current the steering DAC 605. The unit current ($I_{offset}$) of the current steering DAC 605 is derived from the replica circuit which works on PVT independent current and is down multiplied version of the PREAMP 202 current ($I_{bias}$).

As per an embodiment of the present disclosure, the OFFCAN 205 achieves less than ±0.5 LSB accuracy across PVT. The residual offset of 1 LSB (3 mV) is obtained across PVT enhancing the DJ performance for higher data rates beyond 4 Gbps.

TABLE 3

| Jitter without Offset Canceller | | | |
|---|---|---|---|
| DC Offset (mV) | CTLE Output | Pre-amp Output | ICML Output |
| Jitter (ps) @ 125 C. | | | |
| 4 | 25.19 | 35.15 | 39.82 |
| 0 | 25.08 | 23.17 | 24.72 |
| Jitter (ps) @ –40 C. | | | |

TABLE 3-continued

| Jitter without Offset Canceller | | | |
|---|---|---|---|
| DC Offset (mV) | CTLE Output | Pre-amp Output | ICML Output |
| 4 | 27.43 | 35.32 | 43.81 |
| 0 | 27.33 | 24.92 | 26.51 |

TABLE 4

| Jitter with Offset Canceller | | | |
|---|---|---|---|
| DAC Code | CTLE Output | Pre-amp Output | ICML Output |
| Jitter (ps) @ –40 C. | | | |
| 1001 | 25.05 | 30.52 | 32.56 |
| Jitter (ps) @ –125 C. | | | |
| 1001 | 27.32 | 25.89 | 25.89 |

Table 3 and Table 4 represent the jitter in the output without offset cancelation and with offset cancelation respectively. As per Table 3 and Table 4, jitter improves with offset cancelation in comparison to jitter without offset cancelation by about 20%. For instance, as per Table 3 and Table 4, 4 mV DC offset is corrected by offset canceller will be 39.82 and 25.89 for output without offset cancelation and with offset cancelation respectively, reflecting substantial improvement in jitter by using offset cancelation. Further, as per Table 3 and Table 4, higher is the DC offset, higher is the improvement in jitter obtained due to offset cancellation. The OFFCAN 205 provides the offset correction code during 1010 training period itself, by working in parallel after start-up, leading to no extra timing over ahead.

FIGS. 7a, 7b, 7c and 7d, show the eye opening diagrams at various blocks of the equalizer chain for typical PVT conditions. This diagram is a quality indicator of signals in high speed digital transmission. Eye diagram is a quick visual indicator of voltage and timing performance related to jitter (or bit error rate). Representation of an eye diagram is well known to a skilled in the art and is not explained herein for the sake of brevity. Nevertheless, essentially an eye diagram represents that greater the eye opening less is the jitter and vice-versa.

FIGS. 7a, 7b, 7c and 7d, show the eye opening diagram at CTLE circuit 201 input, CTLE circuit 201 output, Pre-amp 202 output and ICML 203 output respectively. Comparison of FIGS. 7a and 7b represents the improvement due to feedforward EOM 204 which provides the optimal values (control codes) for Rs, Cs and Cp. Further, comparison of 7c and 7d represents the improvement due to OFFCAN 205.

FIG. 2 also shows a CML to CMOS 203 circuit which provides a high gain stages to convert data swing obtained at the output of PREAMP 202 to rail to rail swing. The CML to CMOS 203 circuit is biased using a replica bias3 213 for compensating for PVT variations. The operation of the CML to CMOS 203 circuit described here is trivial and the invention is not limited by the circuit or use thereof.

Accordingly, the high performance equalizer of present disclosure, with feed forward EOM 204 and OFFSET cancellation working in parallel with the CTLE circuit 201 during LT1 training mode itself, provides equalization with no extra start-up time (or processing time) as well as maintain low deterministic jitter (DJ). The equalizer with the equalization scheme 20 described as per an embodiment of the present disclosure achieves DJ<0.15 UI over supply voltage range: 0.98V to 1.21V, temperature range: −40 C to 125 C, Frequency (HSOSC 1): 135 MHz, OFFCAN resolution: 3 mV till 45 mV and <(+1-2%) frequency variation across PVT for a given data rate (1.62 Gbps till 5.4 Gbps) and channel length (10 cm to 15 feet), transmitter swing and Pre-emphasis/De-emphasis settings.

The invention should not be regarded as being limited to the embodiments described in above or to the modifications suggested above but various modifications and combinations may be carried out without departing from the scope of the following claims.

The invention claimed is:

1. An equalization method for a receiver comprising:
   receiving input signal at front end of the receiver upon passing through a channel;
   generating, with an eye-opening monitor circuit, a control code based on channel conditions; and
   equalizing, with a continuous-time linear equalization equalizer (CTLE) circuit, the input signal based on the control code, wherein
   the eye-opening monitor circuit and the CTLE circuit are biased based on their corresponding replica circuits, and
   the control code is generated in a feedforward configuration.

2. The equalization method of claim 1, wherein the feedforward configuration allows the control code to be generated in parallel to link training of the CTLE.

3. An equalization system comprising:
   a receiver configured to receive an input signal at front end of the receiver upon passing through a channel;
   an eye-opening monitor circuit configured to generate a control code based on channel conditions; and
   a continuous-time linear equalization equalizer (CTLE) circuit configured to equalize the input signal based on the control code, wherein
   the eye-opening monitor circuit and the CTLE circuit are biased based on their corresponding replica circuits, and
   the eye-opening monitor circuit provides the control code to the CTLE circuit in a feedforward configuration.

4. The equalization system of claim 3, wherein the replica circuits are biased by an oscillator generating a current which is stable across process, voltage and temperature variations.

5. The equalization system of claim 3, further comprising a differential amplifier configured to amplify output of the CTLE circuit, wherein the differential amplifier is biased using a replica circuit which is biased by an oscillator generating a current stable across process, voltage and temperature variations.

6. The equalization system of claim 5, further comprising an offset cancellation circuit configured to reduce random offset of output of the differential amplifier by feedback of an offset correction code, wherein the offset cancellation circuit is biased using the replica circuit which is biased by the oscillator generating the current stable across process, voltage and temperature variations.

7. The equalization system of claim 6, wherein
   the offset cancellation circuit comprises a comparator configured to generate the offset correction code based on comparison of positive and negative dc voltage of the output of the differential amplifier, and
   a current steering Digital to Analog Converter (DAC) connected to the differential amplifier and configured to reduce the random offset of the differential amplifier based on the offset correction code generated by the comparator.

8. The equalization system of claim 7, wherein the comparator of the offset cancellation circuit generates the offset correction code during a link training mode of the CTLE circuit.

9. The equalization system of claim 8, wherein the offset correction code generated by the comparator of the offset cancellation circuit in the link training mode is utilized by the current steering DAC in a normal mode.

10. The equalization system of claim 3, wherein the eye-opening monitor circuit comprises clipper average circuit that generates average positive and average negative voltage signals ($V_P$ and $V_N$) corresponding to an average of the input signal received at front end of the receiver, wherein the eye-opening monitor circuit generates a reference voltage signal ($V_R$) for comparing with the average positive voltage ($V_P$).

11. The equalization system of claim 10, wherein the eye-opening monitor circuit comprises a comparator configured to compare the average positive voltage signal ($V_P$) and the reference voltage signal ($V_R$) and wherein the comparator of the eye-opening monitor circuit generates the control code.

12. The equalization system of claim 3, wherein the eye-opening monitor circuit is configured to generate the control code during training period of the CTLE circuit based on parallel processing of the eye-opening monitor circuit and the CTLE circuit.

13. The equalization system of claim 12, wherein the eye-opening monitor circuit is powered down after a training mode.

14. The equalization system of claim 3, wherein the control code is configured to change frequency response of the CTLE circuit.

15. The equalization system of claim 14, wherein the frequency response of the CTLE circuit is based on one or more resistance and one or more capacitance value.

16. The equalization system of claim 3, wherein the control code is based on the channel length and pre-emphasis settings of a transmitter.

17. An equalization system comprising:
   a receiver configured to receive an input signal at front end of the receiver upon passing through a channel;
   an eye-opening monitor circuit configured to generate a control code based on channel length and pre-emphasis settings of a transmitter;
   a continuous-time linear equalization equalizer (CTLE) circuit configured to equalize the input signal based on the control code;
   a differential amplifier configured to amplify output of the CTLE circuit;
   an offset cancellation circuit configured to reduce random offset of the differential amplifier by feedback of an offset correction code; and
   a CML to CMOS circuit configured to convert data swing of output of the differential amplifier to rail to rail swing,
   wherein the eye-opening monitor circuit, the CTLE circuit, the differential amplifier, the offset cancellation circuit, and the CML to CMOS circuit are biased based on their corresponding replica circuits which are biased by a stable oscillator, and wherein the eye-opening monitor circuit and the offset cancellation circuit respectively generate the control code and the offset correction code during link training mode of the CTLE circuit.

* * * * *